May 13, 1969        L. C. DOOLEY        3,443,319
LEVEL DETERMINING DEVICE AND APPARATUS
Filed Sept. 1, 1966        Sheet 1 of 2
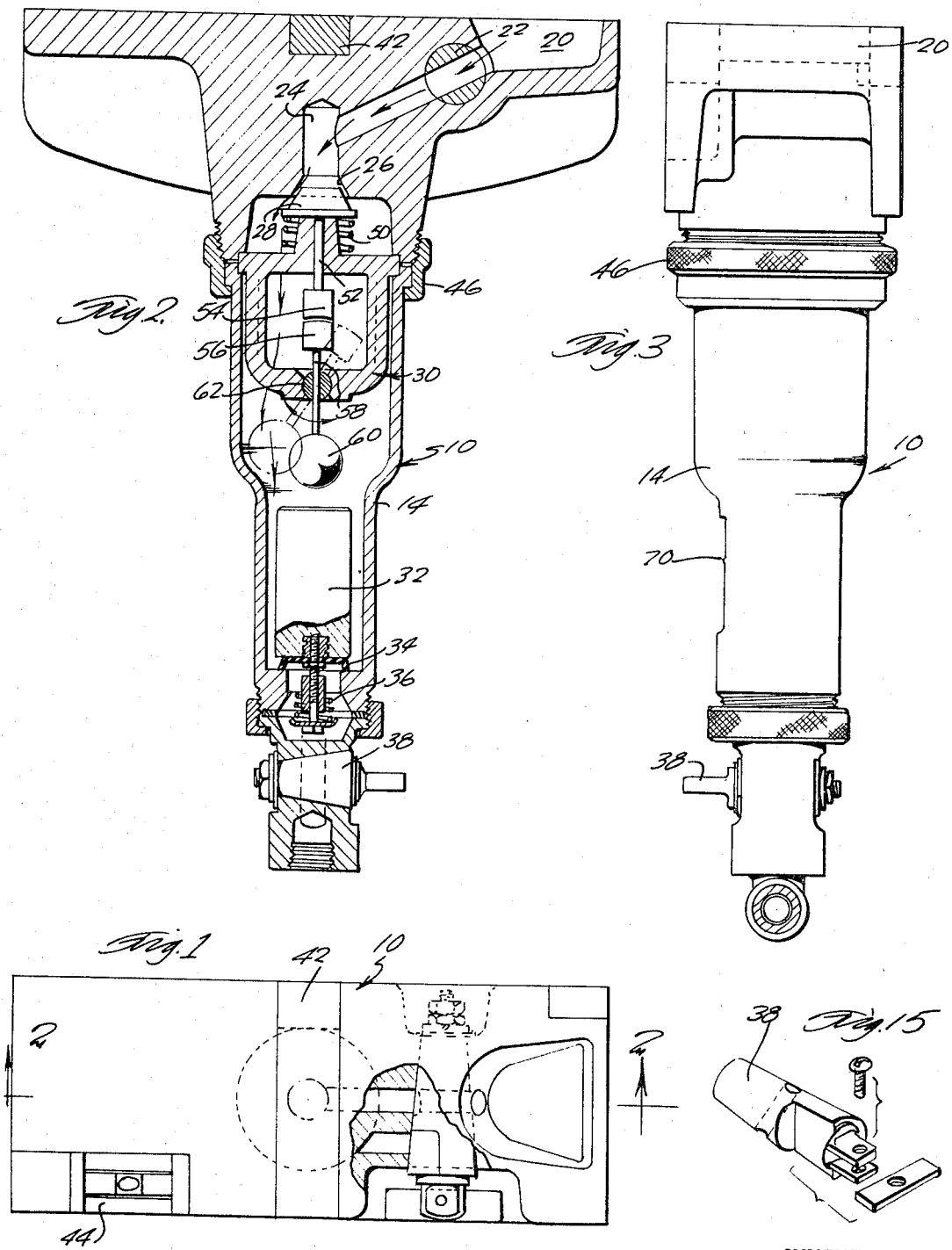
INVENTOR.
LOVELACE C. DOOLEY
BY
Victor J. Evans & Co.
ATTORNEYS May 13, 1969 L. C. DOOLEY 3,443,319
LEVEL DETERMINING DEVICE AND APPARATUS
Filed Sept. 1, 1966
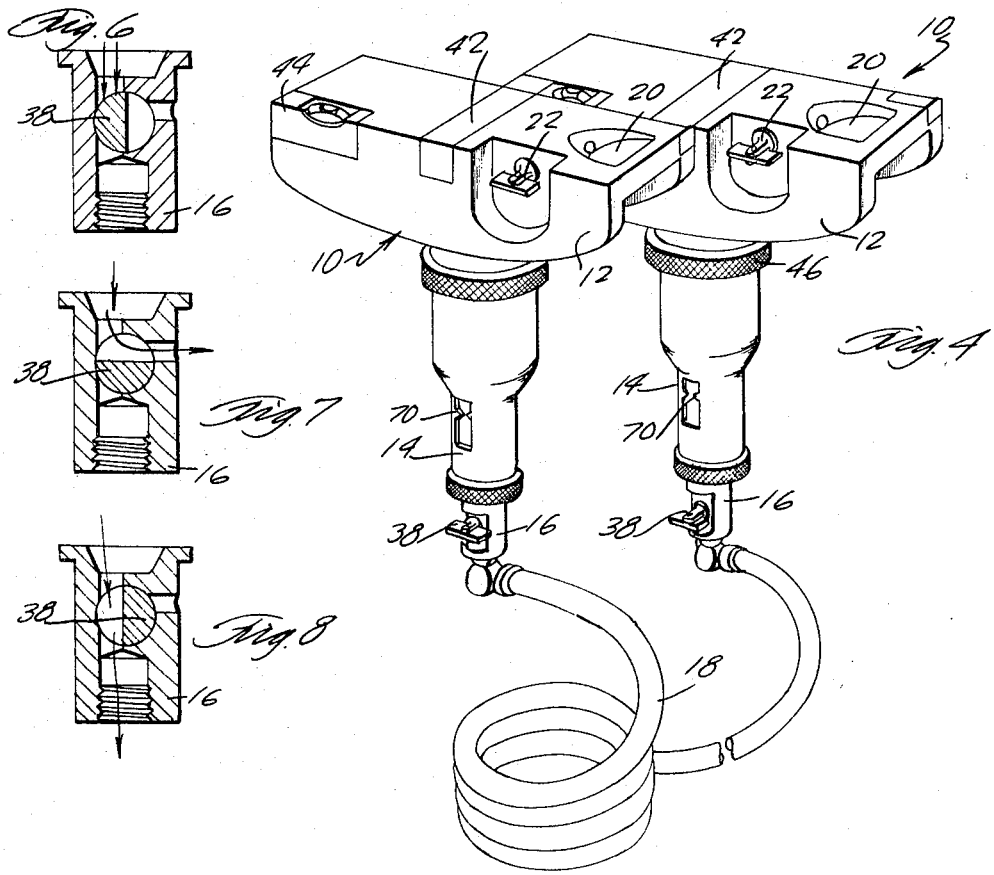
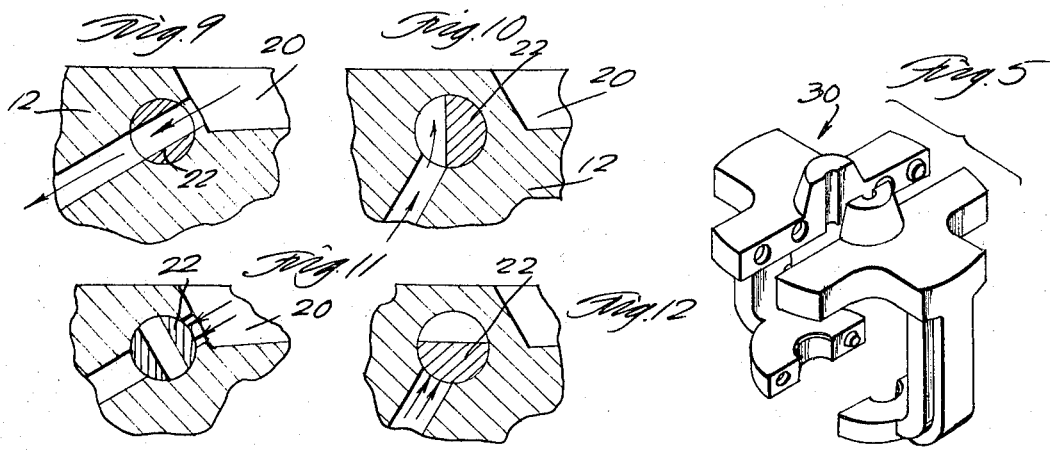
INVENTOR.
LOVELACE C. DOOLEY United States Patent Office 3,443,319
Patented May 13, 1969

3,443,319
LEVEL DETERMINING DEVICE AND APPARATUS
Lovelace Charles Dooley, P.O. Box 3,
Jeanerette, La. 70544
Filed Sept. 1, 1966, Ser. No. 576,595
Int. Cl. G01c 9/22
U.S. Cl. 33—209                                    3 Claims

ABSTRACT OF THE DISCLOSURE

Level determining device having flexibility including magnetic securing elements for affixing the level determining device on steel members, and being provided with a pendulum actuable magnetically responsive valve, so that upon displacement of the pendulum, the valve is closed so that air or water is not allowed to traverse the valve and valve seat of the pendulum actuable valve.

---

The present invention relates to a level determining device and apparatus, and more particularly relates to a new and improved level determining apparatus having a great deal of flexibility in use and construction for use by carpenters, bricklayers, and other building craftsmen, so accurate and secure constructions are obtained.

An object of the invention is to provide a leveling device by which accurate and direct indications of level are obtained from two distant points by which only a flexible hose is interconnected therebetween.

A further object of the invention is to provide a level indicating device and apparatus that is simple in construction, inexpensive, easy to operate, is provided with safety or protective features so that if it is knocked over or becomes detached from its mounting, it is not subject to losing the indicator fluid that is in the leveling system, and further it contains magnetic securing elements for affixing the level determining device upon a steel or iron stake or other such member.

A further object of the invention is to provide a pendulum actuable magnetically responsive valve in the level determining device so that upon displacement of the pendulum, the valve is closed so that air or water is not allowed to traverse the valve and valve seat of the pendulum actuable valve.

The above and other objects and advantages of the invention will become apparent upon full consideration of the following detailed description and accompanying drawings in which:

FIG. 1 is a plan view of one of the level determining components of the apparatus of the present invention;

FIG. 2 is a cross-sectional view taken along lines 2—2 of FIG. 1;

FIG. 3 is a side elevation view of the device shown in FIG. 2;

FIG. 4 is a perspective view showing the arrangement of the components of the device, comprising the two elements forming the level determining apparatus;

FIG. 5 is an exploded perspective view of a cage for the mounting and arrangement of the pendulum actuable valve;

FIGS. 6, 7 and 8 show the manner of positioning the manual valve in the tail member of the device;

FIGS. 9–14 show cross-sectional views for positioning the valve member in the head member incident to its communication with the filling trough; and FIG. 15 is a perspective view of the manual valve used in the level determining device.

Referring now to the drawings, there is shown a pair of level determining devices or elements 10, 10 forming the composite system of level determining apparatus of the present invention; and there is shown the head members 12, 12, the body members 14, 14, the tail members 16, 16, and a flexible elastomeric or rubber type hose 18, as shown in FIG. 4, for connecting the respective tail members 16, 16. In this way, it is seen that a complete communication path is provided from the inlet or filling trough 20 through a manual valve 22 to a passageway 24 communicating with a valve seat 26 and passing a pendulum actuable valve head 28 through a cage 30, then to a float and valve stem 32 for a bottom valve 34 maintained in bias relation by a spring 36 and which communicates further with a bottom manual valve 38 which, in turn, is communicable with the flexible hose 18 and with the other level determining element 12.

In the head member 12, there is disposed a permanent magnet 42 that is disposed transversely of the level determining elements 12, 12, and which adapts the respective elements to be separately mounted from a steel or iron plate, stake or other such material, in accordance with the invention but not shown herein. Also the elements 12, 12 may be mounted or supported from each other as illustrated in FIG. 4, and it is seen that the permanent magnet 42 traverses the entire upper surface of the head member.

There is also mounted within the head members 12, 12, a sight gauge or bubble level 44 to aid in determining the planar orientation of each of the level determining elements 12, 12.

The body member 14 is connected to the head member by a gasket and threaded nut arrangement 46, and within the proximate end of the body member there is shown the cage 30 which contains or mounts the automatic valve comprising the pendulum actuable valve. The cage is constructed of two identical halves so that there are no right or left-handed components forming the cage, and it is seen that the cage is adaptable to mount the valve head 28 which is biased upwardly by a spring 50 and which is provided with a valve stem 52 extending downwardly within the cage. At the other end of the valve stem 52, there is a magnetic responsive material or block 54 that is drawn downwardly by its weight as well as the magnetic field provided by a magnetic block 56 when it is positioned as shown in full line. The block 56 is mounted on a pendulum stem 58 which has a pendulum 60 at its other end but is mounted from an intermediate point by a ball in a swivel joint 62. The angular displacement of the level determining element 10 causes the pendulum 60 to be displaced, as shown in dotted line in FIG. 2, and in which way the magnetic block 56 is displaced, as also shown in dotted line, and the block 54 loses its bias and spring 50 causes the valve head 28 to close with the valve seat 26. In this manner, the pendulum actuable valve is closed for cutting off or closing the passage 24 from the body member.

There is also disposed within the body member the float valve and valve stem 32 so that it closes the valve 34. The spring arrangement 36 is adapted to close the float valve when there is no longer any fluid in the body member which would cause the float 32 to be displaced upwardly.

The volume of liquid confined in the hose and in the body members 14, 14 is thus vented to atmosphere through the pendulum actuable valve in passage 24 when the manual valve 22 is open. The level of the liquid is adjusted to rest proximate to the zero point marker 70, 70 of each of the elements.

FIG. 6 shows the position of the manual valve 38 in tail member 16 with the valve in its closed position, while FIG. 7 shows the valve in bleed position, and FIG. 8 shows the valve in its fill or open position. The inlet manual valve 22 in the upper or head member 12 has its various positions shown in FIGS. 9–14, wherein FIG. 9 shows the valve in filling position, FIG. 10 shows the valve in position to communicate with an air vent (not shown). FIG. 11 shows the manual valve with the water passage closed from communicating with the trough 20, FIG. 12 shows the valve with the vent closed, FIGS. 11 and 12 both showing the valve in its closed position, while FIGS. 13 and 14 show the valve in its open or operating position in which the water passage is closed, as shown in FIG. 13, and in which the vent is open, as shown in FIG. 14.

It is seen that the valve assembly of the level determining elements 10, 10 eliminates the possibility of loss of liquid from the top section of the instruments. Assuming that one instrument 10 is attached in a vertical level position by the use of its permanent magnet 42, the top valve 22 would be open. Then the other instrument may also be held in a level vertical position but at a higher level, for example, and it is seen that the action of the liquid within the system forces the flow from the higher instrument 10 to the other instrument 10 and out the top of the lower instrument if the top valve 22 is open. To prevent this, the float valve assembly 32, 34 is provided which is normally open as long as there is sufficient liquid to cover the float 32. However, as this liquid drops, as in the case where one of the instruments is higher than the other, the float 32 will seat on the valve 34 and a vacuum is formed below this valve 34. By virtue of this vacuum, liquid is prevented from flowing further through the flexible hose 18, and thus the lower instrument is not overflowed with liquid proceeding from the open valve 22.

Where it may be required for storing the instruments comprising the level determining apparatus, the manual valves 22, 22 are respectively closed, and also manual valves 38, 38 may be similarly closed.

It may be assumed in applying the structure and device of the invention that a carpenter or other operator is preparing to lay a foundation or other structure. In using the invention, first he would drive a steel stake or erect an iron wall or other vertical member at the center of a proposed location. After the level determining apparatus of the invention has been calibrated properly, one of the elements 10 is mounted or attached to the iron stake and the other instrument is attached to the desired height on a steel stake located at the other end of the hose 18. By adjustment of the respective units 10, 10, the operator is able to attain as many readings of the level determining apparatus and its elements as are needed until the liquid level at the zero point marker 70 shows zero. This can also be double checked by reversing each of the instruments of the level determining apparatus from one location to the other, and then determining if the level is zero in each instance.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. A level determining apparatus comprising a head member having a valve seat in communication with a filling trough, a magnetic section on said head for attaching said apparatus to a surface, a body member attached to said head member, a pendulum mounted in said body member, magnetic means mounted on the upper end of said pendulum, a valve for engaging said valve seat, said valve having a valve stem, magnetic responsive means mounted on said valve stem, wherein the magnetic means holds the valve in an open position until the pendulum force overcomes the magnetic force, said body member further having a float valve in a chamber communicating with said valve, a tail member mounted for closing off the other end of the body member, and a flexible elastomeric hose for communicating the liquid level in the body member to a distant point.

2. The invention according to claim 1 wherein said flexible hose communicates with said tail member.

3. The invention according to claim 2 wherein said flexible hose communicates with a corresponding tail member, a body member, and a head member at its distal point similar to the aforesaid members, for comprising the level determining apparatus.

References Cited

UNITED STATES PATENTS

| 397,294 | 2/1889 | Karr | 33—209 |
|---|---|---|---|
| 1,566,174 | 12/1925 | Tyler | 33—209 |
| 1,942,630 | 1/1934 | Woodbridge | 251—247 XR |
| 2,438,758 | 3/1948 | Leach | 33—209 |
| 2,814,127 | 11/1957 | Blatchford | 33—209 |
| 3,213,545 | 10/1965 | Wright | 33—207 |
| 3,269,023 | 8/1966 | Calkins | 33—209 |
| 3,279,494 | 10/1966 | Nixon | 251—65 XR |

FOREIGN PATENTS

| 57,718 | 1891 | Germany. |
|---|---|---|

WILLIAM D. MARTIN, Jr., *Primary Examiner.*

U.S. Cl. X.R.

33—221; 251—65